United States Patent [19]

Farman

[11] Patent Number: 5,067,080
[45] Date of Patent: Nov. 19, 1991

[54] DIGITAL CONTROL SYSTEM
[75] Inventor: Brian F. Farman, Endicott, N.Y.
[73] Assignee: Lucas Industries Public Limited Company, Birmingham, England
[21] Appl. No.: 143,240
[22] Filed: Jan. 4, 1988

Related U.S. Application Data

[63] Continuation of Ser. No. 780,930, Apr. 11, 1985, abandoned.

[51] Int. Cl.$^5$ ............................................. G06F 15/48
[52] U.S. Cl. ........................... 364/431.04; 364/431.01; 364/265.1; 364/268.1; 364/944.61; 370/14; 370/85.11
[58] Field of Search ............... 364/424.01, 431.02, 364/431.04, 453, 265.1, 265.5, 268.1, 268.7, 944.61; 370/89, 14, 16, 85.11

[56] References Cited

U.S. PATENT DOCUMENTS

| | | | |
|---|---|---|---|
| 4,101,958 | 7/1978 | Patterson et al. | 364/424 |
| 4,296,601 | 10/1981 | Martin | 364/431.02 |
| 4,303,978 | 12/1981 | Shaw et al. | 364/453 |
| 4,313,167 | 1/1982 | Brown | 364/431.02 |
| 4,523,603 | 6/1985 | Peikert | 364/431.02 |
| 4,525,783 | 6/1985 | Pischke et al. | 364/431.02 |
| 4,528,662 | 7/1985 | Floyd et al. | 370/89 |

FOREIGN PATENT DOCUMENTS

| | | |
|---|---|---|
| 1364625 | 8/1974 | United Kingdom . |
| 2032149 | 4/1980 | United Kingdom . |
| 2057732 | 4/1981 | United Kingdom . |

Primary Examiner—Thomas H. Tarcza
Assistant Examiner—Tod Swann
Attorney, Agent, or Firm—Ladas & Parry

[57] ABSTRACT

A digital control system for a gas turbine engine comprises two identical control lanes each of which includes a digital computer, two data buses, input circuits, output circuits and an interface unit. Each interface unit is arranged to multiplex data on the buses and transmit this data serially through a connection. Each interface unit is responsive to receipt of data from the other unit to generate control signals (read, write and valid address) for the received data, so that, in addition to timing signals on a further connection data only is transferred between the lanes.

11 Claims, 4 Drawing Sheets

DIGITAL CONTROL SYSTEM

This application is a continuation of application Ser. No. 780,930 filed Apr. 11, 1985, now abandoned.

This invention relates to a digital system for generating operating signals for control of an apparatus, and in particular to such a system for use in controlling operation of a gas turbine engine.

A system in which control is primarily or wholly effected by signals from digital computers is commonly referred to as a full authority digital control system. In order to increase the reliability of such a system it has been proposed to provide duplicated control lanes, each of which includes a computer and its associated input and output devices, and to provide internal self-monitoring of each computer, and to cause shut-down of the lane in which a fault is detected, and control of the apparatus to be shifted to the other lane. Since, however, a fault in either lane may originate in the input or output elements, as well as in the computer itself, a fault in different input or output elements in respective lanes may cause known systems to shut down entirely.

The present invention provides a system in which a computer in either of two lanes may directly access input or output elements in the other lane independently of the computer in that other lane, whereby the system as a whole will continue to operate even in the event of a malfunction in both lanes, provided that the same malfunction does not occur in both lanes. In a preferred arrangement the foregoing access is effected in a manner which prevents a fault in one lane from affecting the other lane.

Preferably each of the two lanes includes a memory between the computer and an input/output bus in that lane, and this memory is accessible either by the computer in its own lane or by the computer in the other lane. Conveniently these memories are used to store updated information related to the status of the controlled system, this information being entered in both memories by the computer of the lane which is in control, so that in the event of change of control between lanes, the new controlling computer may immediately act on this information.

The invention provides a digital control system for an apparatus, said system having two control lanes each comprising a digital computer, an input/output circuit, and means for accessing the input/output circuit of the other lane, independently of the computer in that other lane.

In a particular embodiment said means for accessing the input/output circuit in another lane comprises an interface unit having means for receiving signals from the computer in its own lane, means for transmitting these signals to the interface unit in the other lane, and means for transmitting signals received from said unit in the other lane to the input/output circuit and to the computer in its own lane.

In a preferred embodiment said interface units include means for transferring data therebetween in serial form.

Preferably the interconnections between said interface units include means for mutual electrical isolation of the units.

An embodiment of the invention will now be described by way of example only and with reference to the accompanying drawings in which.

Figure 1:
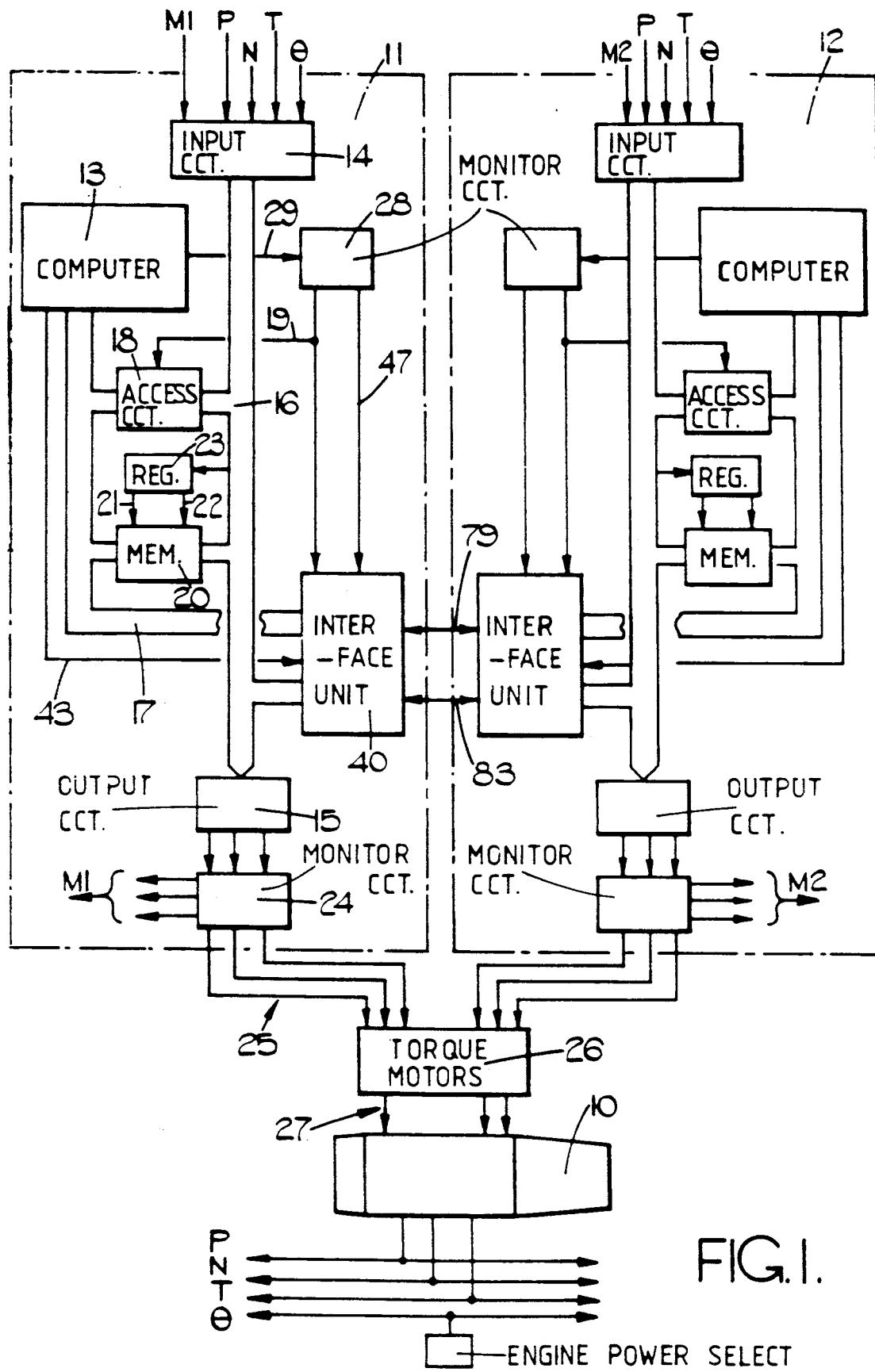
FIG. 1 is a diagram of a digital control system for a gas turbine engine.

The system shown in FIG. 1 is applied to control of the main fuel supply and reheat fuel supply of a gas turbine engine 10. The system comprises two identical control lanes 11, 12, only the lane 11 being described in detail hereafter. Lane 11 includes a digital computer arrangement comprising a digital computer 13, an input circuit 14 and an output circuit 15. The circuits 14, 15 are interconnected by an input/output bus 16 with which a computer bus 17 can communicate through an access circuit 18. The bus 16 carries, inter alia, instruction data and the bus 17 carries, inter alia, address data. Circuit 18 is a buffer which is commercially available under the serial number 54HC646 and is responsive to a signal on a line 19 when computer 13, and hence lane 11, is in control of the system. The buses 16, 17 are also interconnected through a memory 20 which is selectively responsive to signals on lines 21, 22 to store data arriving on the bus 16 from the lane 12, or to transfer this stored data to the bus 17. The signals on lines 21, 22 are provided by a register 23 which is responsive to data bits on the bus 16.

The output circuit 15 provides digital signals to a monitor and conversion circuit 24, from which current signals are supplied on lines 25 to one coil each of three respective dual coil torque motors, indicated at 26, which regulate fluid pressure signals on lines 27 to the main fuel control and reheat fuel control respectively of the engine 10. The circuit 24 also provides monitoring signals M1 to the input circuit 14, these monitoring signals being indicative of the magnitude of the current signals provided to the torque motors 26.

The engine 10 has associated therewith transducers which provide signals corresponding to compressor pressure P, engine speed N, engine temperature T and the position 0 of an engine power selector. The transducers are duplicated and respective signals from each duplicated pair are supplied to the input circuit 14 and to the corresponding circuit in the lane 12.

The computer 13 is a high integrity device and comprises duplicated microprocessors, each with its associated ROM, RAM and input/output interfaces. The two microprocessors have a common clock. The outputs to the computer bus 17 from the duplicated arrangements are compared on a bit-by-bit basis. If a discrepancy persists the computer 13 is considered faulty and a transfer of control to the other lane is indicated. Since a common clock is used, an independent clock generates a signal at fixed intervals, and the common computer clock is used to initiate an interrupt at the same intervals. The timing of the interrupts and of the independent clock signals are compared, and a discrepancy indicates a fault. The computer 13 also periodically executes a program which exercises a full range of instructions and compares the result of this computation with a stored value. Additionally the contents of each ROM are added and the two sums are checked for correspondence with a predetermined value. If any of the foregoing checks indicate a fault in the computer 13, a signal is provided on a line 29 to a monitor circuit 28, and the latter removes the signal from the line 19 so that the computer 13 no longer has access to the input/output bus 16 by way of the circuit 18.

The computer 13 includes a programmable timing circuit of the type available from Monolithic Memories Inc., a division of Analog Devices Inc., under the designation PAL 16R. This timing circuit is programmed to respond to pulses from the computer clock and to an indication that the computer 13 is in control of the system (that is an absence of a fault signal on line 29), to provide controlling READ, WRITE and valid address (ADDR) signals.

In addition to input signals from the circuit 14, the computer 13 reads corresponding signals from the input circuit in the lane 12, in a manner later to be described. The corresponding signals are compared by the computer 13 and if an unacceptable difference is detected the individual signals are checked by one or more of the following methods:

(i) The input signals are examined to see if they lie within a predetermined acceptable range.
(ii) The rate of change of the input signals is checked for acceptability.
(iii) The value of an input signal is compared with a value calculated from the values of other signals from the transducers in the engine 10.

If, for example, the lane 11 is controlling the engine 10, and an input signal from the circuit 14 is found to be defective, the computer 13 will use only the corresponding signal from the lane 12.

Additionally if one of the monitor signals Ml from the circuit 24 indicates that a current signal on one of the lines 25 to the torque motors 26 differs by more than an acceptable amount from its calculated value, the output control signals for the affected torque motor are supplied to the output circuit in the lane 12, in which separate current signals are generated in correspondence with values calculated by the computer 13, and separate coils of the torque motors 26 are energised.

It is to be understood that operation of the lane 11 in relation to lane 12, as described above, applies also to operation of the lane 12 in relation to the lane 11.

Figure 2:
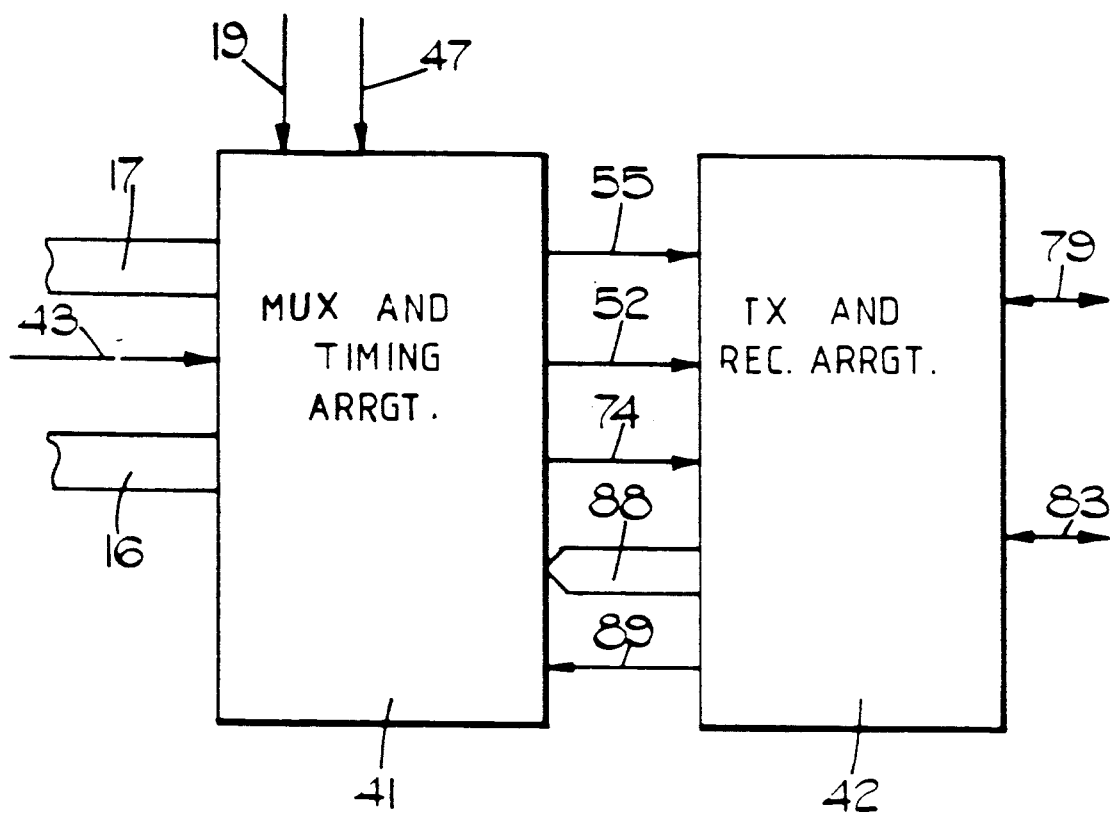
FIG. 2 is a block diagram of an interface in one lane of the system of FIG. 1, and FIGS. 3 and 4 are diagrams of respective parts of the unit shown in FIG. 2.
Figure 3:
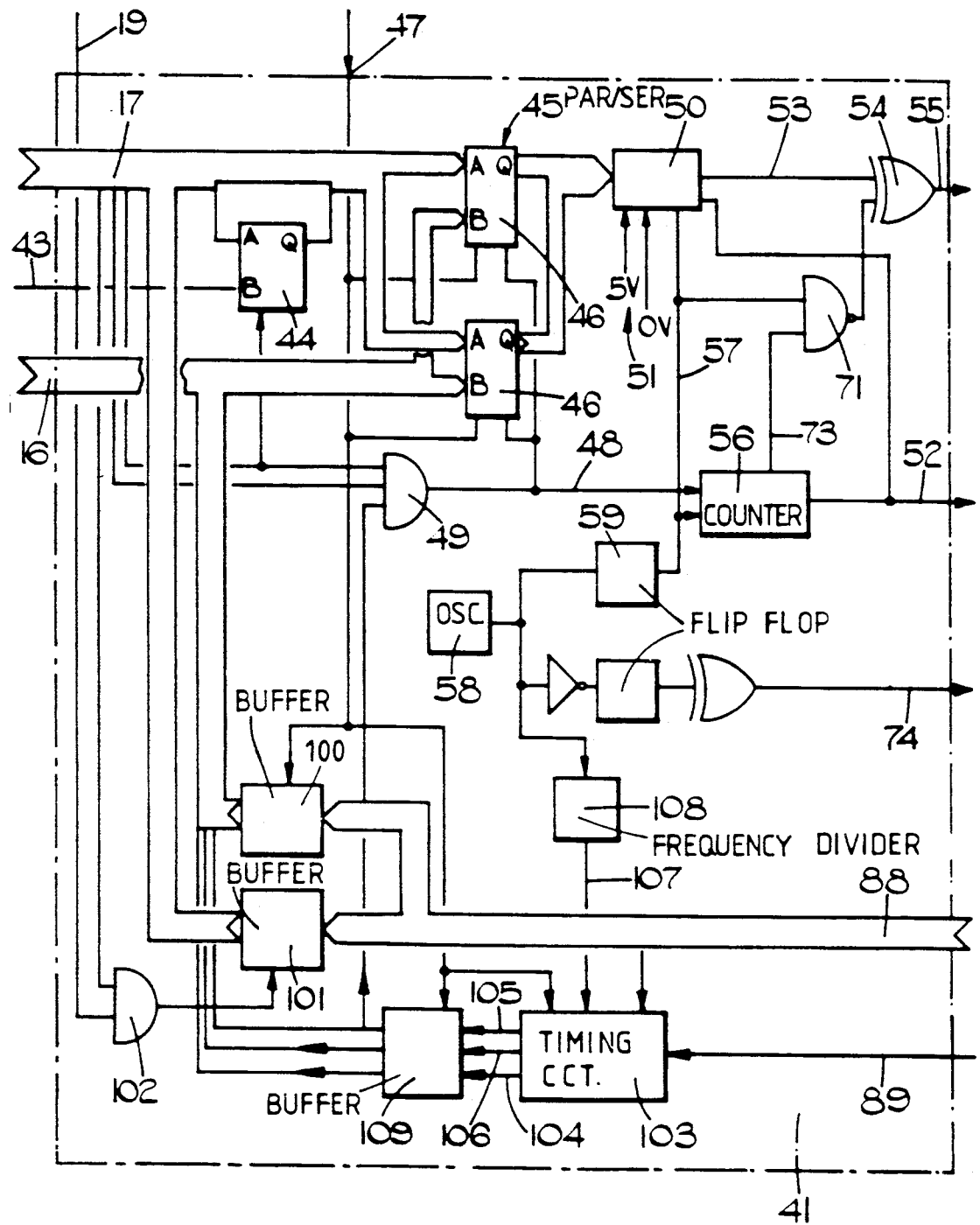
Figure 4:
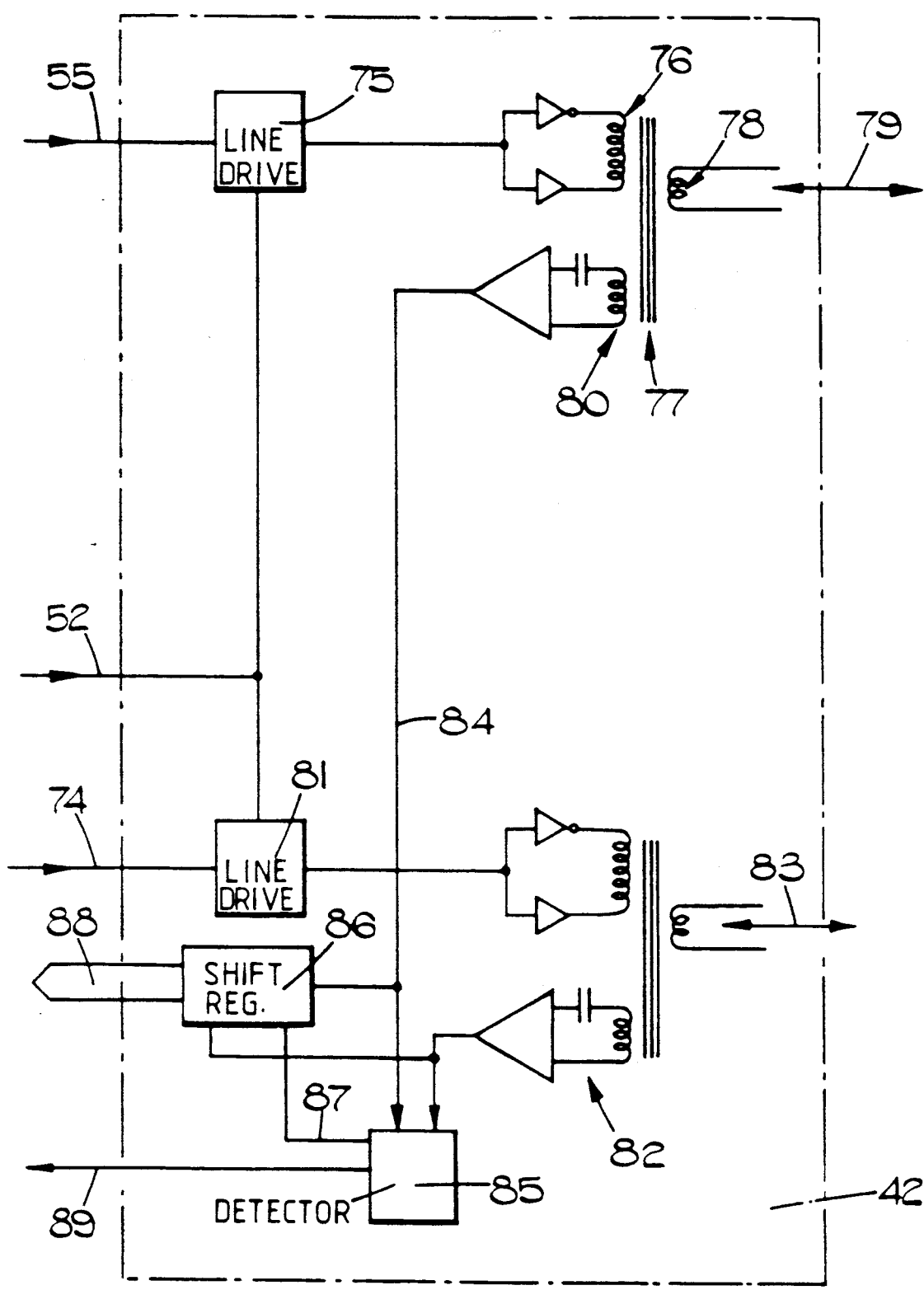

Transfer of data between the lanes 11 and 12 is effected by an interface unit 40, shown in more detail in FIGS. 2 to 4, and a corresponding unit in the lane 12. As indicated in FIG. 2 the unit 40 comprises a multiplexing and timing arrangement 41, shown in detail in FIG. 3, and a transmitting and receiving arrangement 42 shown in more detail in FIG. 4.

The buses 16, 17 each include eight data lines and three control lines, the respective control lines carrying the aforesaid READ, WRITE and ADDR signals. The arrangement 41 is responsive to signals on the eight data lines of the input/output bus 16, and to the eight data lines and READ WRITE and ADDR lines of the computer bus 17, as well as to a READ/WRITE selection signal on a line 43 from the computer 13. A bistable device 44 is responsive to the ADDR signal on the bus 17 and to the READ/WRITE signal on the line 43 to set the least significant bit of the data on the bus 17 in dependence on whether an address therein is to be used to read data from, or write data into, the input/output bus in the lane 12.

The data lines of the buses 17, 16 are applied to respective A and B inputs of an eightfold bistable multiplexing arrangement 45, only two of the bistable devices 46 in this arrangement being shown by way of example in the drawing. Each of the devices 46 is responsive to a selection signal on a line 47 from the circuit 28 (FIG. 1). The signal on the line 47 indicates that the computer 13 in lane 11 is not in control. The data on the bus 16 or bus 17 is passed to the Q outputs of the devices 46 when the lanes 12 or 11 respectively are in control of the system. The devices 46 are enabled by a signal on a line 48 provided by an AND gate 49 which is responsive, inter alia, to the WRITE and ADDR signals on the bus 17. The WRITE and ADDR signals are both logic 0, as is a RREAD signal on a third input to the gate 49. The gate 49 thus provides a required logic 0 output on line 48 when any one of its input signals is logic 0.

The consolidated outputs of the devices 46 are applied to a parallel to serial shift register 50 to which 5 volt and 0 volt signals are also applied on lines 51. The register 50 is responsive to an enable signal on line 52 to provide a ten bit data stream on a line 53, the two additional bits being generated by the signals on lines 51, and providing a start indication "10".

The ten bit serial data on line 53 can pass to the arrangement 42 by way of an exclusive OR gate 54 and a line 55. In addition to providing an enable signal for the multiplexer arrangement 45, the signal on line 48 enables a counter 56. The counter 56 is responsive to 5 MHz clock signals on a line 57. These signals originate in a 10 MHz oscillator 58. The output signals from the oscillator 58 are halved in frequency by a flip-flop 59. The clock signals on line 57 are also used to control the shift register 50 and are applied to one input of a NAND gate 71.

After being enabled by the signal on line 48 the counter 56 first provides the enabling signal on the line 52 to the shift register 50, as described above, whereupon the latter supplies data serially on the line 53. The signal on line 52 is also supplied to the transmitting and receiving arrangement 42. After an interval which permits the shift register 50 to supply the start bits "10" to the line 53, the counter 56 maintains a signal on a line 73 to the other input of the NAND gate 71, which thereafter applies to the exclusive OR gate 54 an inverted form of the clock signal on line 57. The effect is that the data signals on line 55 are thereafter "Manchester encoded" whereby each data bit is transmitted either as "10" or "01". 5 MHz clock signals, which are inversions of the signals on line 57, are also derived from the oscillator 58 and applied on a line 74 to the arrangement 42. The clock signals on line 74 are thus phase shifted with respect to those on line 57, and their leading edges occur at the middle of the first part of each Manchester encoded data bit on line 55.

As shown in FIG. 4 the data on line 55 is applied by way of a line drive circuit 75 to one winding 76 of a pulse transformer 77. A second winding 78 of the transformer 77 is connected by a twisted pair of wires 79 with a corresponding winding in the lane 12. A third winding 80 of the transformer 77 is arranged to receive signals on the wires 79, emanating from the lane 12. The clock signals on the line 74 are applied by way of a line driver 81 to one winding of a pulse transformer 82, identical with the transformer 77. Clock signals can be passed in either direction between the transformer 82 and a corresponding transformer in the lane 12 along a twisted pair of wires 83. The line drivers 75, 81 are both enabled by the signal on the line 52 at the same time as the shift register 50 (FIG. 3).

Data transmitted on the wires 79 from the lane 12 is serially passed on a line 84 to a detector circuit 85 and to a serial to parallel shift register 86. Clock signals on the wires 83 from the lane 12 are also applied to the detector circuit 85 and provide clock pulses for the shift register 86. The detector circuit 85 samples the data pulses on the line 84 at each rising and falling edge of the clock pulses on the wires 83. Since this data is "Manchester encoded" the circuit 85 provides a detection signal on a line 87 only when the "0" start bit from the lane 12 is detected, and the signal on line 87 is used to enable the register 86 which subsequently supplies parallel data on line 88 to the arrangement 41 (FIG. 3). The circuit 85 also provides, on a line 89 to the arrangement 41, a signal coincident with the "0" start bit.

Referring to FIG. 3 buffer circuits 100, 101 receive data on the lines 88. Buffer 100 is responsive to the signal on line 47 so that when the lane 11 is not in control of the system the data on lines 88 is passed to the bus 16.

An AND gate 102 is responsive to the signal line 19 indicating that lane 11 is in control and to the READ signal on one of the control lines in the bus 17. In the presence of both of these signals the AND gate 102 provides a control signal to the buffer 101 which then supplies data from the lines 88 to the computer 13 by way of the bus 17. A programmable timing circuit 103, of the type described above under the designation PAL 16R4, is responsive to the start signal on line 89, to an indication on line 47 that the lane 11 is not in control and to the READ/WRITE selection signal from the computer in lane 12. The circuit 103 is also responsive to 150 kHz clock pulses on a line 107, these pulses being derived from the 10 M Hz oscillator 58 by way of a frequency divider 108. The circuit 101 is programmed to respond to its input signals to generate a sequence of signals on lines 104, 105, 106.

The signal on line 104 is a valid address signal RADDR which is generated after an address has been received on lines 88 from the computer in the lane 12, and is maintained until the end of the succeeding data to which that address relates. The signal on line 105 is a RREAD signal which, if the READ/WRITE selection signal in the address requires data to be read, places a "read" instruction on the input/output bus 16, so that data from an addressed channel of the input circuit 14 may be transferred to the lane 12.

The RREAD signal is also applied to one input of the AND gate 49 to provide the signal on line 48 enabling transfer of data to the lane 12 from the bus 16. The signal on line 104 is a RWRITE signal which, if the READ/WRITE selection signal in the address requires data from the computer in lane 12 to be supplied to the output circuit 15 or to the memory 20, places a "write" instruction on the bus 16.

The memory 20 may thus be constantly updated with calculated values from the computer in lane 12, so that if control is changed from lane 12 to lane 11 the computer 13 will have immediate access to these values, instead of having to calculate the values afresh from input data.

The RREAD signal on line 105 is supplied to the AND date 49, and the signals on lines 104, 105, 106 to the bus 16, by way of a further buffer circuit 109 responsive to an enabling signal on the line 47, indicating that the computer 13 is faulty and that lane 12 is in control of the system.

It will be seen that in any operating condition clock signals are passing in one direction only on the wires 83, from whichever of the lanes 11, 12 is in control. It will also be seen that at any time data is passing in one direction only on the wires 79. If, for example, data from a channel of the input circuit 14 is to be read into the computer in the lane 12, the address of that data, accompanied by a "read" instruction is first transmitted on the wires 79 to the lane 11, and the data itself subsequently transmitted back to the lane 12 under control of the RREAD signal, as described above.

It will also be seen that the control signals READ, WRITE and ADDR are not transferred between the lanes, but that corresponding signals are generated in each lane in response to reception of the "0" start bit from the other lane.

Data and clock pulses are transferred between the lanes 11, 12 under control of the PAL 16R4 circuits in the computers in each lane and in the interface unit 40 in lane 11 and in the corresponding unit in lane 12. The PAL 16R4 circuits are effectively hard-wired programs whose characteristics are determined by blowing fusible links in an array comprised by an unprogrammed device. No software need therefore be prepared for programs to enable the computers in the lanes 11, 12 to effect data transfer.

I claim:

1. A digital control system having two control lanes which are selectively operable to control an apparatus, each lane comprising:
   a digital computer;
   input and output devices;
   an input-output bus for connecting said devices to said computer;
   means responsive to selection of that lane as inoperable to control said apparatus for isolating said computer from said input-output bus; and
   an interface unit, said interface unit including;
   means, responsive to a signal selecting that lane as operable to control said apparatus, for transmitting data from said computer to the input-output bus in the other lane and for receiving data from the input-output bus in said other lane;
   means, responsive to a signal selecting that lane as inoperable to control said apparatus, for transmitting data from said input-output bus to the computer in said other lane, and for receiving data from the computer in said other lane;
   means for generating an indicating signal for separate groups of data transmitted; and
   means responsive to indicating signals from the other lane for generating control signals for handling an indicated data group from that other lane.

2. A control system as claimed in claim 1 in which each said interface unit includes a device for converting data into serial form for transmission in said transmission line and a device for converting received serial data into parallel form.

3. A control system as claimed in claim 1 in which said transmission line comprises a twisted pair of wires.

4. A control system as claimed in claim 1 in which each said interface unit includes means for generating timing signals, a transmitter for sending said timing signals to the interface unit in the other lane, a receiver for timing signals from its own lane, means responsive to the timing signals from its own lane, for controlling transmission of data to the other lane, and means responsive to timing signals from the other lane for controlling reception of data from said other lane.

5. A control system as claimed in claim 4 in which said receiver for timing signals and said transmitter for timing signals are together comprised by a pulse transformer.

6. A control system as claimed in claim 1 in which each said lane includes a memory for storing calculated values supplied by the computer in the other lane, and for supplying said values to the computer in its own lane.

7. A control system as claimed in claim 1 in which each lane includes two of said data buses, one of said buses providing an input-output bus for the lane and the other bus communicating directly with said computer, said buses being interconnected by a buffer circuit which is responsive to a signal indicating that said computer is operating satisfactorily.

8. A digital control system according to claim 1 in which each said interface unit includes means for selectively passing to said transmission line either data on said input-output bus or data originating in said computer.

9. A control system as claimed in claim 8 in which each said interface unit includes a device for converting data into serial form for transmission in said transmission line and a device for converting received serial data into parallel form.

10. A digital control system according to claim 1 in which each said interface unit includes means for generating timing signals and means for causing said timing signals to pass to the interface unit in the other lane only when data is being transmitted to said other lane.

11. A digital control system according to claim 1 which includes means for transmitting data from said bus only when the lane containing that bus is not operable to control said apparatus, and for transmitting data from said computer only when the lane containing that computer is operable to control said apparatus.

* * * * *